United States Patent [19]
Northrop

[11] Patent Number: 5,463,165
[45] Date of Patent: Oct. 31, 1995

[54] SCRUBBING OF OILFIELD WASTE GAS IN SUBTERRANEAN FORMATIONS

[75] Inventor: Paul S. Northrop, Bakersfield, Calif.

[73] Assignee: Mobil Oil Corporation, Fairfax, Va.

[21] Appl. No.: 169,235

[22] Filed: Dec. 20, 1993

[51] Int. Cl.$^6$ ........................................................ B09B 3/00
[52] U.S. Cl. ............................................ 588/250; 405/128
[58] Field of Search .................................... 588/249, 250;
405/128, 258, 263; 166/305.1, 305 D

[56] References Cited

U.S. PATENT DOCUMENTS

| | | | |
|---|---|---|---|
| 2,707,171 | 4/1955 | Miller | 166/305 D |
| 5,022,787 | 6/1991 | Kuragasaki et al. | 405/128 |
| 5,111,883 | 5/1992 | Savery | 166/269 X |
| 5,314,265 | 5/1994 | Perkins et al. | 588/250 X |

FOREIGN PATENT DOCUMENTS

| | | | |
|---|---|---|---|
| 366182 | 5/1990 | European Pat. Off. | 588/250 |
| 0960620 | 6/1964 | United Kingdom. | |
| 1336315 | 11/1973 | United Kingdom. | |

*Primary Examiner*—David H. Corbin
*Attorney, Agent, or Firm*—Alexander J. McKillop; George W. Hager; Charles A. Malone

[57] ABSTRACT

This invention is directed to a method for scrubbing hazardous components from waste or flue gas in depleted or swept regions of a reservoir. In the practice of this invention, a waste gas is coinjected into a depleted or swept region along with an aqueous reactant. The swept or depleted regions serve as a reactor. The gas and an aqueous reactant in an amount sufficient to react with said gas is allowed to remain in the depleted or swept region for a time sufficient to react with said gas and remove harmful or hazardous components from the gas. Thus, harmful or hazardous components are scrubbed from the gas. When the scrubbed gas breaks through at another spaced apart site, a gas substantially devoid of harmful or hazardous components is produced to the surface.

22 Claims, 1 Drawing Sheet

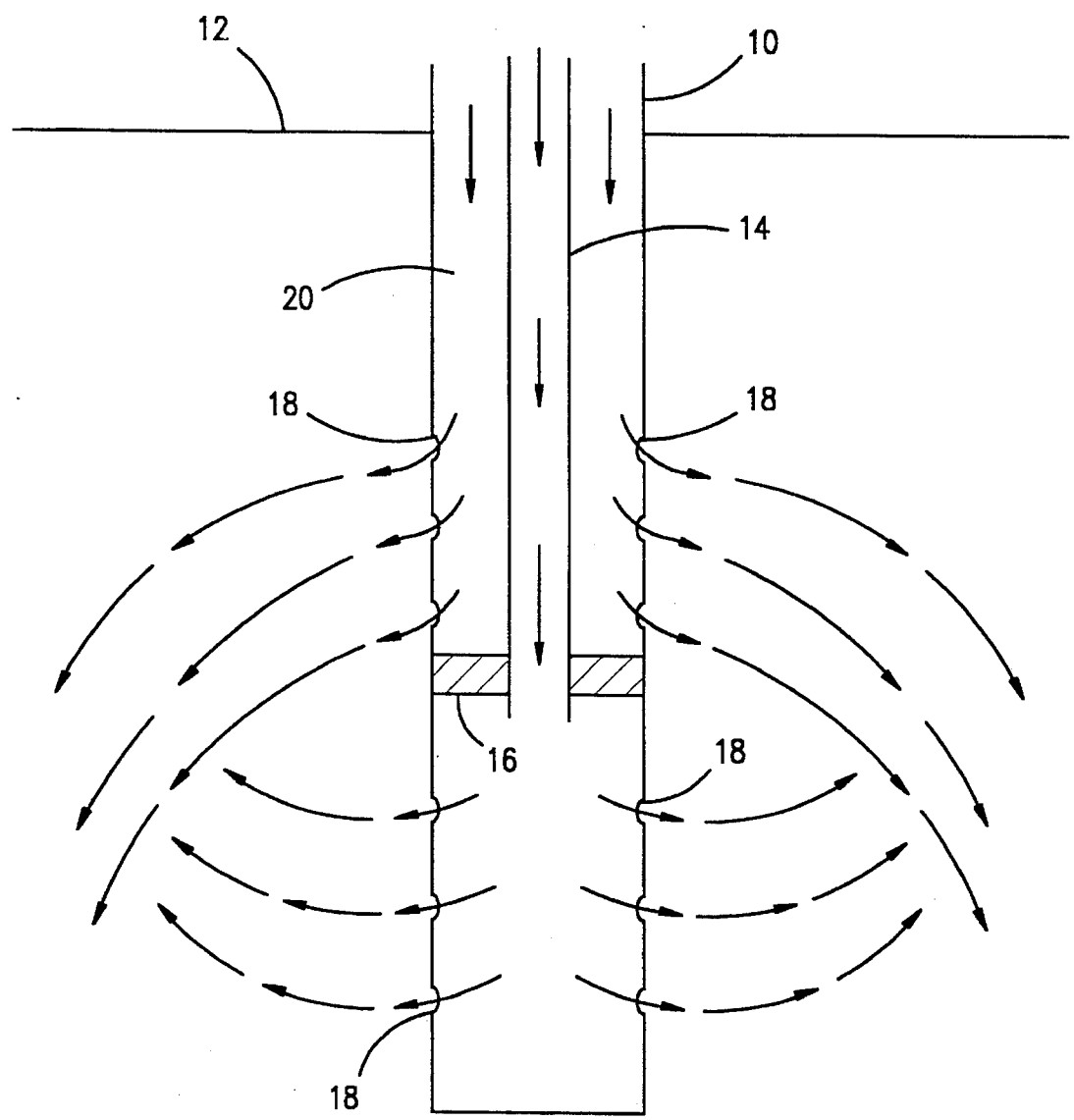

SCRUBBING OF OILFIELD WASTE GAS IN SUBTERRANEAN FORMATIONS

FIELD OF THE INVENTION

The present invention relates to the disposal of gas in subterranean formations and in one of its aspects relates to a method for disposing of waste gas from hydrocarbon production wherein the gas is injected into a spent zone of a formation from which hydrocarbonaceous fluids were produced.

BACKGROUND OF THE INVENTION

It is common for many hydrocarbon reservoirs to produce gas which has low BTU content and high carbon dioxide concentrations (typically called "waste gas") along with the more valuable hydrocarbons. It is also common for such waste gas to be contaminated with trace amounts of hydrogen sulfide which, as is well known, is particularly hazardous to the environment. Accordingly, disposal of the waste gas after it is separated from the other produced fluids presents a real problem in commercially producing such reservoirs.

Many oilfield operators in California have difficulty in disposing of low-BTU produced gases. Regulations regarding waste gas emissions grow more strict each year. In order to avoid the environmental problems associated with venting these gases, several techniques have been proposed for disposing of waste gas in an ecologically-acceptable manner. One such well known disposal technique involves mixing the waste gas with a higher BTU gas and then burning the resulting mixture as fuel at or near the production site, e.g. fuel to generate steam for reinjection into the producing formation to heat heavy oil and the like. Burning of waste gas as fuel, however, normally requires that the gas first be treated to remove any hydrogen sulfide that may be present in the waste gas. This requires relatively expensive equipment which, in turn, routinely experiences substantial downtime (e.g. 10% or more) during normal operation. Since it is desirable to continue the production of hydrocarbons even during periods when the gas treating equipment is down, disposal of the waste gas again presents a problem since it can not be burned during these periods.

Other proposed techniques for disposing of waste gas have involved injecting the waste gas through an injector well directly into a depleted or spent zone of the formation from which the gas was produced. For example, in a heavy oil reservoir where steam is injected to heat the oil to reduce its viscosity, it has been proposed that waste gas from the production be injected into the steamed-out, already produced zones of the formation. However, due to the high diffusivity of the waste gas within a typical producing formation, the waste gas has a tendency to quickly and easily flow from the steamed-out zone, through the hydrocarbon producing zone, and to the production well(s) to be produced again with the hydrocarbons. This "early breakthrough" of the waste gas at the producing wells seriously detracts from the apparent benefits otherwise derived from this disposal technique since the waste gas is "reproduced" and accordingly, has to be "redisposed of" which, in turn, substantially adds both to the problems of handling the waste gas and to the costs involved.

Therefore, what is needed is a method for disposing of waste gas in a swept or depleted zone where the gas is reacted within the formation to remove harmful products therefrom so as to produce a waste gas to the surface that is substantially free of harmful products.

SUMMARY OF THE INVENTION

This invention is directed to a method for scrubbing hazardous components from waste gas in depleted or swept regions of a reservoir. In the practice of this invention, a waste gas is coinjected along with an aqueous reactant into a depleted or swept region. The swept or depleted regions serve as a reactor. The waste gas and an aqueous reactant in an amount sufficient to react with said gas is allowed to remain in the depleted or swept region for a time sufficient to react with said gas and remove harmful or hazardous components from the waste gas. Thus, harmful or hazardous components are scrubbed from the waste gas. When the scrubbed waste gas breaks through at another spaced apart site, a waste gas substantially devoid of harmful or hazardous components is produced to the surface.

The aqueous reactant comprises a hydroxide of an alkali metal. Because of its availability, sodium hydroxide is preferred. Alternatively, an oxidant such as air mixed with an aqueous catalyst can be utilized. Air alone can be used as a reactant but the reaction is slow. If hydrogen sulfide is the primary concern, basic zinc carbonate can be utilized, which would form insoluble zinc sulfide upon reacting with hydrogen sulfide.

Preferably, the depleted or swept region should comprise a high permeability zone since precipitation reactions might occur due to the presence of divalent cations. In order to ensure maximal contact between the waste gas and aqueous reactant, a slug of reactant can be injected into the depleted or swept region prior to the initial waste gas injection.

It is therefore an object of this invention to scrub harmful or hazardous components from waste gas by coinjecting said gas and reactant into a depleted or swept region of a reservoir.

It is another object of this invention to remove harmful or hazardous components from waste gas produced from a formation as well as from other gases with similar compositions such as flue gases.

It is a further object of this invention to remove harmful or hazardous components from waste gas disposed of in a formation so that a gas substantially free of those components can be revented and economically processed.

It is a yet further object of this invention to use a depleted or swept region of a reservoir as a reactor to scrub harmful or hazardous components from waste or flue gas.

BRIEF DESCRIPTION OF THE DRAWING

The drawing is a schematic representation of a preferred embodiment of the invention where the gravity effects of the waste gas and the aqueous reactants are utilized advantageously.

BRIEF DESCRIPTION OF THE PREFERRED EMBODIMENTS

This invention is directed to a method for scrubbing hazardous components from waste gas in depleted or swept regions of a reservoir. In the practice of this invention, a waste gas is coinjected along with an aqueous reactant into a depleted or swept region. The swept or depleted regions serve as a reactor. The waste gas and an aqueous reactant in an amount sufficient to react with said gas is allowed to remain in the depleted or swept region for a time sufficient to react with said gas and remove harmful or hazardous components from the waste gas. Thus, harmful or hazardous components are scrubbed from the waste gas. When the scrubbed gas breaks through at another spaced apart site, a waste gas substantially devoid of harmful or hazardous components is produced to the surface.

Injection is accomplished by directing the waste gas along with the aqueous reactant into a depleted or swept formation region or area which is penetrated by an injector well or wellbore. The injector well fluidly communicates with a second spaced apart producer well or wellbore. The reactant is injected into the well in an amount sufficient to react with harmful or hazardous components contained in the waste gas. As is preferred, the aqueous reactant which is utilized comprises a solution of an alkali metal hydroxide. Because of its availability, sodium hydroxide is preferred. When the reactant is sodium hydroxide, waste components in the gas react to the sodium hydroxide according to the following reactions:

$$H_2S + NaOH(aq) \rightarrow NaHS(aq) + H_2O$$

$$SO_2 + NaOH(aq) \rightarrow NaHSO_3(aq)$$

$$CO_2 + NaOH(aq) \rightarrow NaHCO_3(aq)$$

Alternatively, the waste gas can be mixed with air and coinjected with brine thereby obtaining reactions according to the following equations:

$$2H_2S(aq) + O_2 \rightarrow 2S + 2H_2O$$

$$SO_3^{-2}(aq) + O_2 \rightarrow SO_4^{-2}(aq)$$

When air is utilized, the reaction is relatively slow. In order to speed up the reaction with air, a liquid catalyst or initiator, preferrably aqueous iodine may be added to the brine. The liquid mixture is coinjected into the injector well along with the waste gas and air. If hydrogen sulfide is the main concern, basic zinc carbonate could be added to precipitate as zinc sulfide.

In those situations where steam generators are utilized in close proximity to a depleted or scrubbed zone of a reservoir, those gases can also be scrubbed by the method herein disclosed. These flue gases from steam generators contain harmful components which are similar to those contained in the waste gas that is produced from a reservoir. Flue gases produced from steam generators are generally created in large amounts. California for example has especially stringent emission controls; thus generation of these gases is becoming more restricted. Use of the this invention in connection with these flue gases will afford a means of disposing of these flue gases and waste gases in a reservoir so that gases substantially free of hazardous components can be revented from the reservoir after the gases have remained there for a desired amount of time for reactions to occur. As will be understood by those skilled in the art, the amount of time that the aqueous reactant and the gas will remain in the depleted or scrubbed zone is formation dependent. That is, it will vary depending upon the particular characteristics of the swept or depleted zone or region.

The purpose of the reactant is to remove hazardous or harmful components before gas breakthrough occurs or before reventing the gases from the formation. In order to maximize waste gas contact with the reactant, it is preferred to inject a slug of the reactant into the swept or depleted region prior to injecting the waste or flue gas therein. Since precipitation reactions may occur due to the presence of divalent cations present in formation water, a high permeability formation should be employed. Otherwise, a low permeability formation may be plugged or closed with precipitates resultant from reactions between the formation water and the reactant. The formation water should not be too acidic, as $H_2S$ could be regenerated. Most formation waters are fairly neutral. Therefore, $H_2S$ regeneration is not expected to present a problem.

Because the waste or flue gases contain hazardous or harmful components that are corrosive, it is preferred to use corrosion-resistant tubular materials. These corrosion-resistant tubular materials should preferably be used in the injector well(s) since the producer well(s) will receive a waste gas substantially devoid of corrosive components.

In a preferred embodiment, referring to the drawing, a completed well 10 is directed into a formation 12 containing a high permeability swept or depleted region. Tubing 14 is directed down the well 10 through production packer 16. The production packer is placed in well 10 so as to isolate an upper and lower perforated portions of the wellbore. Production packer 16 is used to allow the waste gas to be directed down tubing 14 so as to exit the wellbore via perforations 18. The aqueous reactant is directed down annulus 20 that is formed between the casing of wellbore 10 and the tubing 14. Being isolated from the lower portion of the wellbore via packer 16, the aqueous reactant exits wellbore 10 via perforations 18 at a higher level than the waste or flue gas therebelow. In this manner, substantial mixing is made between the waste or flue gas and the aqueous reactant entering the formation via the wellbore so that substantially intimate contact is made between the gas and reactant to obtain a more efficient reaction therebetween. This arrangement ensures good mixing between the two phases i.e. the waste gas phase and the liquid reactant phase.

Shale stringers i.e. impermeable layers of rock must not be present in the high permeability swept or depleted zone as contact might not be obtained between the waste or flue gas and the aqueous reactant entering the formation. If shale stringers are present, the reaction could be substantially inhibited. As can be appreciated by those skilled in the art, the depleted or swept regions of the reservoir effectively act as a low cost chemical reactor. Since the depleted or swept region of the reservoir offers a significant volume or area for the containment of gas, it acts as a reactor in which hazardous components are scrubbed. This eliminates the prior art problem of reventing hazardous components into the atmosphere which were initially contained in the gases disposed of in the reservoir or formation. The reactant removes hazardous or harmful components from the waste gas before gas breakthrough or reventing occurs. In order to maximize contact via the reactant with the gas, it is preferred to inject a slug of reactant prior to injecting the waste gas or flue gas into the formation.

Obviously, many other variations and modifications of this invention as previously set forth may be made without departing from the spirit and scope of this invention as those skilled in the art readily understand such variations and modifications are considered part of this invention and within the purview and scope of the appended claims.

What is claimed:

1. A method for scrubbing hazardous components from waste gas or flue gas in a depleted or swept region of a reservoir comprising:

coinjecting a waste gas or flue gas and an aqueous reactant into a depleted region of a reservoir in an amount and for a time sufficient to remove hazardous components from said gas thereby scrubbing said waste gas before the scrubbed gas is removed from said reservoir.

2. The method as recited in claim 1 where said waste gas and aqueous reactant are injected into a first well and scrubbed gas is removed via a second well.

3. The method as recited in claim 1 where said waste gas and aqueous reactant are injected into one well and scrubbed gas is subsequently removed from that well.

4. The method as recited in claim 1 where a slug of reactant is injected into the depleted reservoir prior to coinjecting the gas and aqueous reactant into said depleted reservoir.

5. The method as recited in claim 1 where the aqueous reactant comprises a solution of an alkali metal hydroxide.

6. The method as recited in claim 1 where the aqueous reactant comprises a solution of sodium hydroxide.

7. The method as recited in claim 1 where in lieu of an aqueous reactant the waste gas is mixed with air.

8. The method as recited in claim 1 where in lieu of an aqueous reactant the waste gas is mixed with air and a liquid catalyst.

9. The method as recited in claim 1 where in lieu of an aqueous reactant the waste gas is mixed with a gaseous oxidant and an aqueous iodine initiator.

10. The method as recited in claim 1 where the depleted reservoir comprises a high permeability zone of said depleted reservoir.

11. A method for scrubbing hazardous components from waste or flue gas in a depleted or swept zone of a reservoir comprising:

coinjecting a waste or flue gas and an aqueous reactant into a depleted zone of the reservoir by at least one well in an amount and for a time sufficient to remove hazardous components from said gas thereby scrubbing said gas before scrubbed gas is removed from said reservoir.

12. The method as recited in claim 11 where said well is comprised of a tubing and casing made of corrosion-resistant materials.

13. The method as recited in claim 11 where the scrubbed gas is removed from said reservoir by at least one spaced apart well.

14. The method as recited in claim 11 where a slug of reactant is injected into the depleted reservoir prior to coinjecting the gas and aqueous reactant into said depleted reservoir.

15. The method as recited in claim 11 where scrubbed gas is subsequently removed by said well.

16. The method as recited in claim 11 where the aqueous reactant comprises a solution of an alkali metal hydroxide.

17. The method as recited in claim 11 where the aqueous reactant comprises a solution of sodium hydroxide.

18. The method as recited in claim 11 where in lieu of an aqueous reactant the gas is mixed with air.

19. The method as recited in claim 11 where in lieu of an aqueous reactant the gas is mixed with air and a catalyst.

20. The method as recited in claim 11 where in lieu of an aqueous reactant the waste gas is mixed with a gaseous oxidant and an aqueous iodine initiator.

21. The method as recited in claim 11 where the depleted reservoir comprises a high permeability zone of said depleted reservoir.

22. The method as recited in claim 11 where said well comprises a cased well having an upper and a lower perforated section separated by a mechanical packer that is penetrated by a tubing where said waste gas is injected into said reservoir via lower perforations and the aqueous reactant is injected into said reservoir by the upper perforations thereby obtaining substantially improved mixing between said gas and the reactant.

* * * * *